United States Patent [19]
Mattes et al.

[11] 4,002,853
[45] Jan. 11, 1977

[54] VISUAL RING INDICATOR

[75] Inventors: Hans George Mattes, Ocean Township, Monmouth County; Daniel Edward Oates, Fair Haven, both of N.J.

[73] Assignee: Bell Telephone Laboratories, Incorporated, Murray Hill, N.J.

[22] Filed: Aug. 13, 1975

[21] Appl. No.: 604,162

[52] U.S. Cl. .............................................. 179/84 L
[51] Int. Cl.² ........................................ H04M 1/21
[58] Field of Search ............ 179/84 L, 84 C, 84 R, 179/81 C, 81 R

[56] References Cited
UNITED STATES PATENTS

| 2,477,918 | 8/1949 | Wortman | 179/84 L |
| 3,055,981 | 9/1962 | Smith | 179/5 R |
| 3,288,935 | 11/1966 | Hepner | 179/84 L |
| 3,502,819 | 3/1970 | Rogers | 179/84 L |

Primary Examiner—Kathleen H. Claffy
Assistant Examiner—Joseph A. Popek
Attorney, Agent, or Firm—Charles E. Graves

[57] ABSTRACT

An automatic visual ring indicator for telephone station sets which includes a mechanical indicator element viewable through a window in the telephone housing. The indicator element assumes its on position in response to the ringing action of the telephone. The off position of the indicator element is resumed in response to switchhook motion as in removal of the telephone handset.

7 Claims, 2 Drawing Figures

VISUAL RING INDICATOR

FIELD OF THE INVENTION

This invention relates to indicators for telephone apparatus and particularly to visual ring indicators for signalling that individual telephone station sets have been rung.

BACKGROUND OF THE INVENTION

Ring indicators are in use in conjunction with answering services and automatic call recording devices. If a telephone has rung in a user's absence, the indicator serves to inform the user that a message may have been taken. One such device comprises a plunger which is projected when ringing occurs. Reset is achieved by manually depressing the plunger. Another device employs a magnetic field to advance a visual indication of ringing into view on a unit attached to the telephone housing. Here, manual reset by depression of a plunger is also needed. In systems adapted for other telephone applications, automatic reset mechanisms do exist. None of the above devices have succeeded in utilizing existing telephone functions to full advantage in the visual indication of ringing.

It is, therefore, an object of this invention to utilize as much as possible existing components and functions of telephone station sets in achieving a visual ring indicator, thereby minimizing the complexity and cost of equipment and installation.

A further object of this invention is to provide a completely automatic visual ring indicator for use with telephone answering systems and in other applications where such indication is desirable.

An added object of the invention is to contain the indicator apparatus within existing telephone housings.

SUMMARY OF THE INVENTION

This invention is an automatic visual ring indicator for informing a user that an incoming call was received from which a message may have been taken. In its simplest form it utilizes the ringing action of the telephone to move a visual indication of ringing into an on position, viewable through a window in the telephone housing. When the telephone handset is next picked up by the user, the resulting action of the switchhook causes reset of the visual indicator to the off position, also viewable through the window in the telephone housing.

For a telephone having a clapper and gong ringing system, a pivoting indicator element is employed pursuant to one aspect of the invention. When the clapper vibrates in response to an incoming call, it strikes an extension of the pivoting arm of the indicator element. The arm is thereby thrown off balance and causes an on signal, supported atop the pivoting arm, to be pivoted into view underneath the window. The indicator element is reset by a cam on the switchhook lever which returns the pivoting arm to its balanced state moving an off signal, also supported atop the arm, into view beneath the window.

DETAILED DESCRIPTION OF AN ILLUSTRATIVE EMBODIMENT

Figures 1, 2:
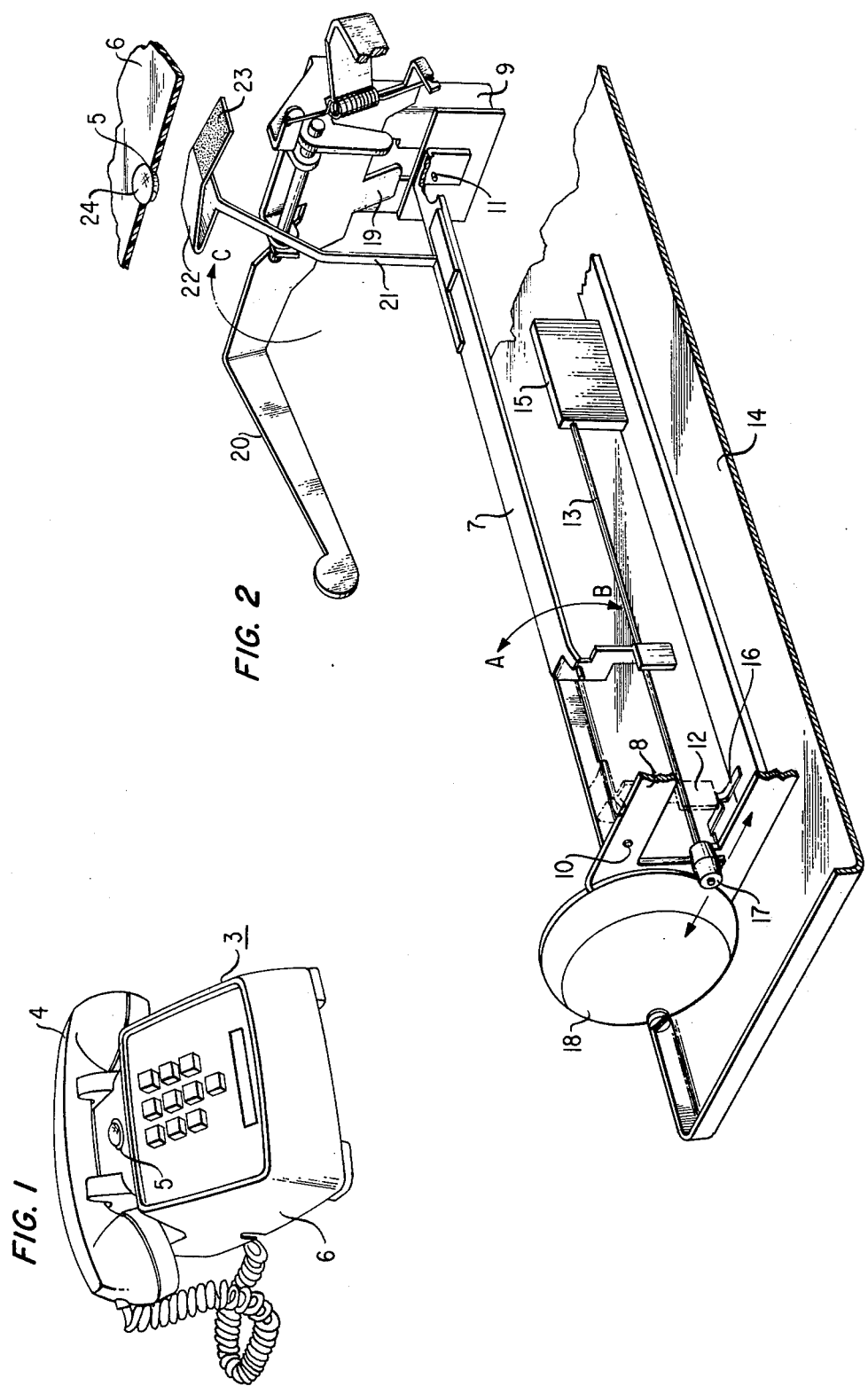
FIG. 1 is a frontal perspective view showing the exterior of a conventional telephone station set with the invention in place.
FIG. 2 is a side schematic, partly exploded view illustrating the mechanisms of a visual ring indicator disposed inside the telephone with the housing and unrelated components removed.

In FIG. 1, the numeral 3 designates a telephone station set with which the invention would be used. The station set 3 is of the type having a ringing system to indicate an incoming call and a conventional telephone handset 4.

In the preferred embodiment of FIG. 2, all apparatus is contained in the telephone housing 6. The broad functional elements represented therein are a ringer comprising crosspiece 8, clapper arm 13, armature 15, clapper 17 and gongs 18 of which only one is shown. The indicator element comprises a pivoting unit consisting of pivot arm 7, pivot points 10 and 11, and pivot arm extension 12, detent spring 16, indicator support 21, nonreflective surface 22 and reflective surface 23; a reset mechanism comprising telephone handset 4, switchhook 9, switchhook cam 19 and switchhook lever 20; and viewing means comprising aperture 5 and light pipe 24.

Structurally, pivot arm 7 (actual location near crosspiece 8 shown in dotted lines) is mounted lengthwise in the housing between crosspiece 8 and switchhook 9 at pivot points 10 and 11. Pivot arm extension 12 extends downward perpendicular to pivot arm 7 so as to be in close proximity to clapper arm 13, attached at the lower end of the housing base 14 to armature 15. Detent spring 16 is attached to crosspiece 8 so as to contact pivot arm extension 12. Clapper 17, attached to the upper end of clapper arm 13, is suspended between gongs 18. Switchhook cam 19 is attached to the lower midsection of switchhook lever 20. Attached perpendicularly to the top surface of pivot arm 7 is indicator support 21, to the top of which is affixed nonreflective surface 22 on the right and reflective surface 23 on the left. Aperture 5 is fitted with a single-unit light pipe 24 made of a transparent polymer, for example.

OPERATION

The indicator element is put in its on position in the following manner. When clapper arm 13 vibrates in response to energizing by an incoming call, it impacts pivot arm extension 12. This impact is sufficient to overcome the restraining force of detent spring 16 which prevents motion of pivot arm extension 12 due to normal jarring of the telephone station set. The impact on pivot arm extension 12 throws pivot arm 7 off balance putting it into a mode of rotation about pivot points 10 and 11. As pivot arm 7 undergoes counterclockwise rotation, indicated by arrow A, reflective surface 23 is moved beneath aperature 5 where it remains.

The indicator is reset to its *off* position when the handset is picked up. Switchhook cam 19 exerts a downward force on the right side of pivot arm 7 as switchhook lever 20 rotates upward in the direction of arrow C. The force exerted by switchhook cam 19 causes pivot arm 7 to assume a clockwise rotation, indicated by arrow B, about pivot points 10 and 11. As pivot arm 7 undergoes clockwise rotation, nonreflective surface 22 is moved beneath aperture 5. The indicator element remains in this position until another incoming call is received.

When reflective surface 23 is beneath aperture 5 in the on position, ambient light is admitted and reflected through the transparent polymer back to the observer who notes that his phone has been rung. When nonreflective surface 22 is beneath aperture 5, no light is reflected to the observer who thus notes that his phone has not been rung.

Those skilled in the art will perceive many alternate embodiments of this invention which conform with the principles of this disclosure.

The reflective and nonreflective surfaces of the indicator element may be replaced by words or colors which indicate *on* or *off* status of the device.

Aperture 5 may be placed in various locations on the telephone housing or in a separate unit disposed to display a visual signal when a signal indicative of calling is transmitted from within the telephone housing to the unit.

Alternatively, for those telephone station sets having the ringer in a separate housing, a signal indicative of ringing may be transferred from the separate housing to the telephone station set, causing a visual signal to be displayed.

The spirit of the invention is embraced in the scope of the claims to follow.

What is claimed is:

1. A telephone station set having a visual ring indicator for informing a user that said station set has been rung, where said station set includes a switchhook and a ringing system comprising a clapper which vibrates in response to an incoming call, said apparatus comprising: an indicator element having at least an on and off position, said indicator element comprising: a mechanical link responsive to physical impact of said vibrating clapper for placing said indicator element in said on position; means for resetting said indicator element to said off position in response to operation of said switchhook; and means for viewing said on and off positions of said indicator element.

2. Apparatus pursuant to claim 1 wherein said mechanical link element comprises a pivoting unit disposed to rotate in a first direction in response to said clapper impact and in an opposite direction in response to said resetting means.

3. Apparatus pursuant to claim 1 wherein said indicator element further comprises a nonreflective surface disposed so as to be visible through said viewing means when said indicator element is in said *off* position; and a reflective surface disposed so as to be visible through said viewing means when said indicator element is in said *on* position.

4. Apparatus pursuant to claim 3 wherein said viewing means comprises a window in the housing of said telephone station set.

5. Apparatus pursuant to claim 4 wherein said viewing means further comprises a light pipe with one end disposed above said nonreflective surface when in said off position and said reflective surface when in said on position and the other end affixed within said telephone housing beneath said window.

6. Apparatus pursuant to claim 2 wherein said means for resetting said indicator element comprises: a telephone handset; and a cam extension attached to said switchhook, said cam extension exerting a force on said pivoting unit as said switchhook changes state in response to motion of said telephone handset, said force causing rotation of said pivoting unit so that said indicator element assumes said off position.

7. Apparatus pursuant to claim 6 wherein said indicator element further comprises a nonreflective surface disposed so as to be visible through said viewing means when said indicator element is in said off position and a reflective surface disposed so as to be visible through said viewing means when said indicator element is in said on position and wherein said pivoting unit further comprises an elongated pivot arm mounted lengthwise in said station set between said switchhook and said gong, the gong end of said pivot arm having a downwardly extended arm for engagement with said clapper and the switchhook end of said pivot arm having an upwardly extending support for said reflective and nonreflective surfaces, said pivoting unit being pivoted from a first point substantially beneath said switchhook and from a second point adjacent said gong.

* * * * *